Oct. 14, 1930.  H. BECK  1,778,287
DEVICE FOR RECORDING THE CONDITION OF RAILWAY TRACKS
Filed July 6, 1929
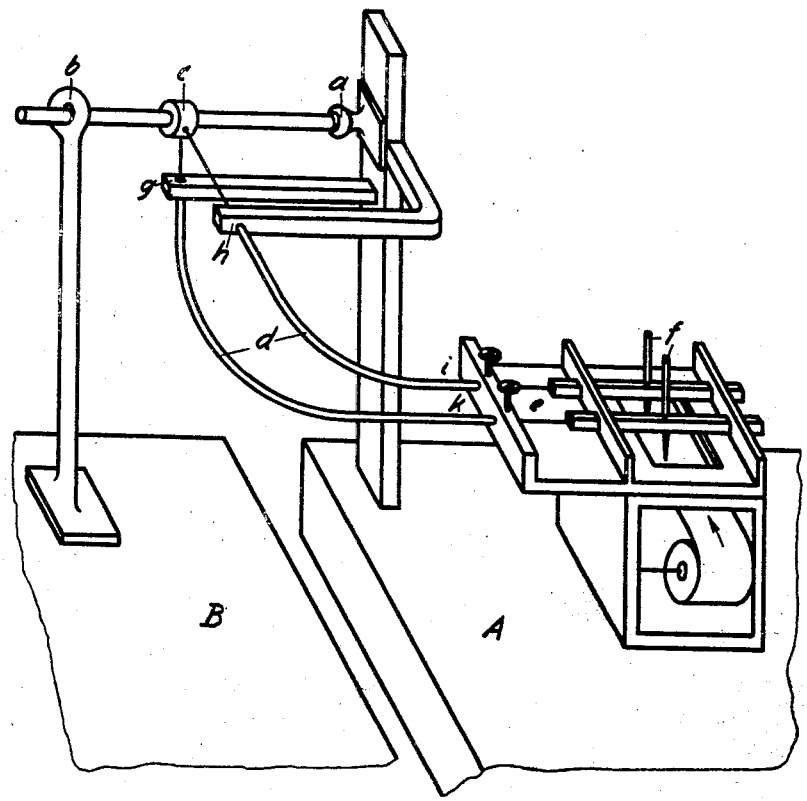

Patented Oct. 14, 1930

1,778,287

UNITED STATES PATENT OFFICE

HEINRICH BECK, OF BAD MUNSTER-ON-THE-STEIN, GERMANY

DEVICE FOR RECORDING THE CONDITION OF RAILWAY TRACKS

Application filed July 6, 1929, Serial No. 376,470, and in Germany July 6, 1928.

The object of the invention is an apparatus serving to obtain from a vehicle in movement, a representation on paper of the condition of the track in order to obtain from this representation particulars of faults and dangerous points in the track giving rise to uneven running of the vehicle or even such as might cause derailments.

It is a known fact that a vehicle running over the track, on account of insufficiently fixed or supported rail joints (points where two rails butt together) or of uneven ballasting, undergoes vertical jolts, which give rise to the known bumping movement of the vehicle, and that deflections in the line of the track, bad transmission arcs in the track curves, and the like, cause a rocking movement of the vehicle similar to the rocking of a vessel, which are unpleasant to travellers and under certain circumstances might lead to derailments. The running is particularly dangerous when both these faults take place at the same time as then a lifting of the load from a wheel owing to the jolting and a running off of the flange due to the rocking, might take place at the same time causing the climbing of the flange on to the rail and thus a derailment to be made dangerously possible.

It is therefore of the highest importance to obtain a representation on paper giving with certainty the places on the track which must be improved, and indicating what the faults are.

Apparatuses have been already contrived which are fitted in a special vehicle, the test car, and which indicate faulty places of the track. These apparatuses give, however, incomplete indications of the track condition in so far that they are limited to the indication of the vertical faults, and while showing also track widenings and excess elevations and the speed at the moment of the testing car, leave out of consideration the horizontal faults which are of the greatest importance in the matter of endangering working security. They serve for the measurement of the curve of the rails, or to register the continuously altering distance between the top of the vehicle and the rails, and mostly work with pendulums or with a writing instrument which is driven by special feeling devices, spinning mechanism, or a mass subject to inertia. These apparatuses are all engaged in the measurement of the faults in the track in absolute dimensions, and leave it to the one who reads the registering strip to imagine the effect of these faults on the running of the vehicles and on the safety of the line. It is therefore again a matter of making a subjective judgement, of exactly what should be avoided.

The object of the invention differs from these known apparatuses in that it does not indicate the fault itself of the track but the counteraction directly thereof on the running of a vehicle, and in such manner that the faults influencing the running are made known with certainty as to their nature and extent.

As now the partciular movements caused by the track take place with all vehicles at the same point and in the same way, there arises between the movements of two adjacent vehicles, a constant temporary displacement. By means of this constant relation of the two vehicles to each other, it is permissible, instead of the usual measurements from vehicle to rail, to make one from vehicle to vehicle.

The invention consists therefore in an apparatus which transmits compulsory the relative movement of one vehicle with respect to the adjacent vehicle on a tracing indicator situated on the latter.

In this it is preferable with steam locomotives to indicate the relative movement between the locomotive and the tender, and with tank locomotives and electric locomotives the freely adjustable axle (running axle or axle box) carried in the frame, will be used as the adjacent vehicle in the sense of the above explanation.

The apparatus, according to the invention, is shown as an example on the drawing in Figure 1 in diagram. Let A indicate one vehicle, for example, a locomotive, and B the other, the tender. A point $a$ on the locomotive A is connected with a point $b$ of the tender B by a rod, a tube or the like in such manner that the rod is fixed at $a$ with a ball joint and is carried at $b$ freely movable in all directions. The rod therefore takes part in the relative movement of the point $b$ to the point $a$, in so far as these movements lie in a perpendicular plane to the rod. The movement to be registered is taken off at a point $c$ lying between $a$ and $b$, and transmitted by a Bowden wire, that is, by an easily displaceable steel wire running through a spiral wire tube, to a tracing indicator, and on a scale corresponding to the ratio $a c : a b$.

To decompose the movement into the vertical and horizontal components, two wires are fitted, one running perpendicularly and the other horizontally. The spiral wire guides $d$ and fixed at one end on the two fixed points $g$ and $h$ on the locomotive, and with the two other ends on the tracing indicator at the point $i$ and $k$. The axially displaceable wires $e$ are connected to the point $c$ with one end, and each with a tracing pen $f$ at the other end.

The tracing pens therefore move exactly by the same amount across the paper strip as the point $c$ moves towards $g$ and $h$.

A movement from $c$ to $g$ is caused by a jolting of the locomotive and has therefore the same signification as a weak point in the track. A movement from $c$ to $h$ is caused by the rocking of the locomotive and indicates bad direction of the line. If both tracing pens work at the same time, this indicates a rolling of the locomotive. The dimensions of the movements, their frequency and their form, are proportional to the size of the faults in the track. The indicator card produced shows therefore directly the state of the track.

The transmission of the movement may take place in a different manner as, for example, by a cord running over rollers with counter spring, or by rods or the like, and in the same way instead of the rods other forms of transmission may be chosen as, for example, telescopically arranged tracing pens on the tender against vertical indicator card surfaces on the locomotive.

What I claim and desire to secure by Letters Patent of the United States is:—

1. Apparatus for the representation on paper of track conditions from a moving vehicle, characterized by the indicating pens of a registering apparatus arranged on one vehicle being so actuated from the adjacent vehicle that they compulsorily indicate in a definite scale the relative movements of the two vehicles with respect to each other in so far as these movements lie in a plane perpendicular to the travelling direction.

2. Apparatus according to claim 1, characterized by the movement to be registered being taken off from a connecting rod, a tube, or the like, fitted between the two vehicles, the connecting member being fixed at one end by a ball or cross joint and being carried in such manner at the other end that it can follow all movements.

3. Apparatus according to claim 1, characterized by spiral tubes with axially easily displaceable wire cores being used for the transmission of the relative movement, one of the spiral wire connections running horizontally and one vertically, so that the movements are not recorded absolutely but decomposed into their vertical and horizontal components.

HEINRICH BECK.